No. 12,813. REISSUED JUNE 16, 1908.

W. F. KRICHBAUM.

RELIEF VALVE.

APPLICATION FILED APR. 18, 1907.

Witnesses:

C. L. Kesler

H. B. Tooley

Inventor

William F. Krichbaum

By

James L. Norris

Atty.

THE NORRIS PETERS CO., WASHINGTON, D. C.

UNITED STATES PATENT OFFICE.

WILLIAM F. KRICHBAUM, OF NEWARK, NEW JERSEY, ASSIGNOR, BY DIRECT AND MESNE ASSIGNMENTS, TO FOSTER ENGINEERING CO., OF NEWARK, NEW JERSEY, A CORPORATION OF NEW JERSEY.

RELIEF-VALVE.

No. 12,813. Specification of Reissued Letters Patent. Reissued June 16, 1908.

Original No. 833,062, dated October 9, 1906, Serial No. 279,795. Application for reissue filed April 18, 1907. Serial No. 369,037.

*To all whom it may concern:*

Be it known that I, WILLIAM F. KRICHBAUM, a citizen of the United States, residing at Newark, in the county of Essex and State of New Jersey, have invented certain new and useful Improvements in Relief-Valves; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention relates to that class of valves known as "relief-valves" and which are employed for relieving the excess of a fluid-pressure which is rising above a certain predetermined point, such relief being either into the atmosphere or into a low-pressure tank or chamber or elsewhere.

The objects of the invention are to secure an auxiliary-operated valve of such a character; to secure a balanced valve which shall work more sensitively; to enable the closeness of working of the valve to be controlled by the size or diameter of the auxiliary-valve passage; to secure a simple and improved construction, and to obtain other advantages and results, some of which may be hereinafter referred to in connection with the description of the working parts.

The invention consists in the improved relief-valve and in the arrangements and combinations of parts of the same, all substantially as will be hereinafter set forth, and finally embraced in the clauses of the claims.

Figure 1:
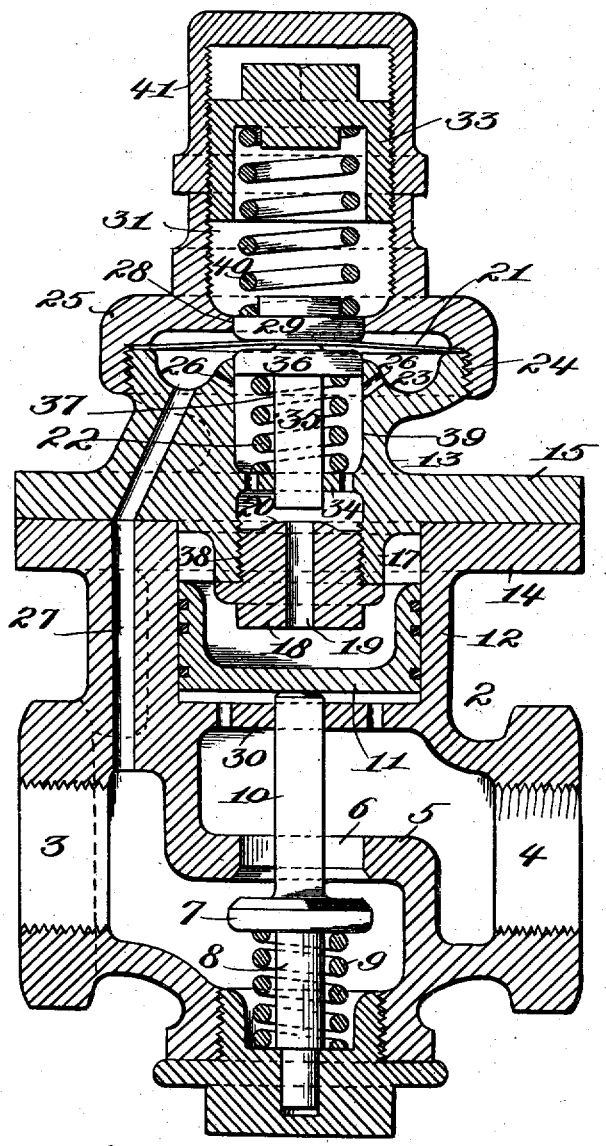
Figure 2:
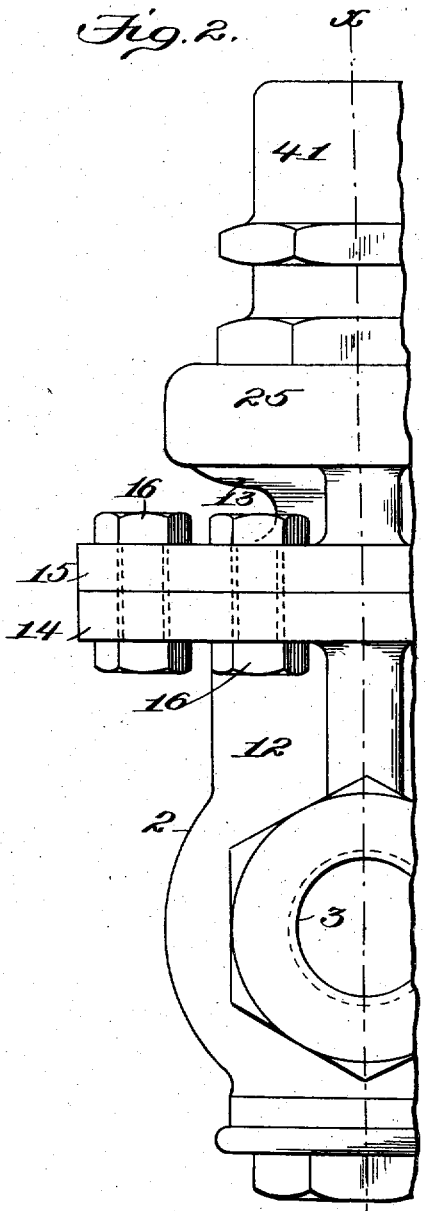

Referring to the accompanying drawings, in which like numerals of reference indicate corresponding parts in each of the several figures, Figure 1 is a central vertical section of my improved valve, taken on line *x*, Fig. 2; and Fig. 2 is a partial elevation of the valve looking lengthwise of the pipe.

In said drawings, 2 indicates the body portion of the valve, apertured and threaded at one end 3 to receive a high-pressure supply-pipe and at its other end 4 to receive a continuation of said pipe beyond the valve. Between its said ends the body portion 2 has a partition 5, as is common in globe-valves, and in said partition is an aperture 6, forming at its under side a horizontal seat for a valve 7. Said valve 7 has a stem which extends both upwardly and downwardly, the lower portion 8 being surrounded by a coiled spring 9, which supports the weight of the valve and its piston. The upper portion 10 of the stem extends through the top of the valve-chamber proper and engages a piston 11, arranged in a piston-cylinder 12, which is preferably formed integral with the valve-body 2 and separated therefrom by the partition 30. Upon the top of said cylinder 12 of the body portion 2 of the valve is mounted a top piece 13, the two parts being preferably connected by means of flanges 14 15 and bolts 16. The said top 13 has a central boss 17 at its bottom, which projects downward into the top of the piston-cylinder 12, the whole top piece having a central passage 39, which is preferably threaded for its lower end portion 38 in said boss 17. Into this threaded portion 38 is screwed a seating-plug 18, having a passage 19 opening through a raised seat 20 at the top of the plug. Obviously instead of threading and screwing the said seating-plug 18 into its place as described above said plug could be bolted, clamped, or otherwise removably secured in position.

In the upper part of the passage 39 is mounted a valve 37, having an upper head 36, adapted to fill said passage, and a lower reduced shank 35, sliding in a spider 34 to hold it central. The end of said shank 35 forms a valve-surface adapted to engage the seat 20, and the top of the valve abuts at its center against a diaphragm 21, a coiled spring 22, arranged between the said spider 34 and the head 36 of the valve, holding said valve against the said diaphragm. The said diaphragm 21 is arranged in a chamber formed by recessing the upper extremity of the top piece 13, as at 23, the outer periphery of said top being threaded, as at 24, to receive a diaphragm-cap 25, adapted to screw thereon and form with the said recess 23 a chamber. The diaphragm 21 is arranged transversely across said chamber, being held or clamped at its edges between the said parts 13 and 25, and which parts might obviously be separably connected in any suitable way other than by screwing. From the lower part of the diaphragm-chamber port-holes 26 lead to the passage 39 of the top piece 13, and a channel 27 leads from said diaphragm - chamber downwardly to the main-valve passage. It will be understood, therefore, that when the pressure which is controlled by the relief-valve rises beyond that at which the spring 40 is set it tends to raise the diaphragm 21 and allow the auxiliary valve 37 to open away from the valve-seat 20. The excess pressure then passes through the passage 19 and forces the piston 11 downward to open the main valve 7, so that said excess pressure discharges directly through the valve-body portion 2. Furthermore, the area of the top of the valve 37 which presses against the under side of the diaphragm 21 is made equal in area to the valve-seat 20, so that the valve 37 is perfectly balanced so far as normal fluid-pressure upon it is concerned. Again, the closeness of working of the valve can be controlled by varying the size of the passage 19 of the auxiliary valve—that is, by enlarging it a greater volume of pressure is quickly admitted to open the main valve, while by making it smaller the flow is retarded, and consequently the opening of the main valve is delayed.

The diaphragm-cap 25 of the valve has a central aperture or passage which receives at its lower portion 28 a spring-washer 29, resting against the upper side of the diaphragm 21, while the upper portion 31 of said passage is interiorly threaded, as at 32, to receive an adjusting-nut 33, said nut and the washer 29 being adapted to receive between themselves a coiled spring 40. This spring, it will be seen, thus exerts the pressure against which the auxiliary valve 37 opens, and such pressure is regulated by screwing the adjusting-nut 33 either up or down. When adjusted to the desired position, an interiorly-threaded cap 41 of the same internal diameter as the part 31 of the passage and adapted to screw upon the adjusting-nut is applied, as shown, said cap serving both as a locking nut and to protect the threads of the adjusting-nut, which would otherwise be exposed.

Obviously my improved valve thus described can be employed for any pressure fluid whatever and will always work close. Furthermore, it should be noted that my valve will operate equally well to relieve either into the atmosphere or into a low-pressure chamber.

Having thus described my invention, what I claim as new is—

1. In a pressure-controlling device, a body portion having inlet and outlet ends with a partition providing a valve-seat and having a piston-cylinder at one side, a main valve for said valve-seat having a stem and a piston therefor in said cylinder, a top piece closing the outer end of said piston-cylinder and having a chamber providing an auxiliary valve seat with a passage leading therefrom to the piston-cylinder, the said body portion and top piece providing a passage from the inlet end of the body portion to said chamber, an auxiliary valve in said chamber and being adapted to engage said seat to close communication between the said passages, a flexible diaphragm closing the outer end of said chamber, and means for holding the auxiliary valve against said diaphragm, the area of contact of said auxiliary valve with the diaphragm being substantially equal to the valve-seat.

2. In a pressure-controlling device, a body portion having inlet and outlet ends with a partition between providing a valve-seat and having a piston-cylinder at one side, a main valve for said valve-seat having a stem and a piston therefor in said cylinder, a top piece closing the outer end of said piston-cylinder and having a chamber providing an auxiliary valve-seat with a passage leading therefrom to the piston-cylinder, the said body portion and top piece providing a passage from the inlet end of the body portion to said chamber, an auxiliary valve in said chamber and being adapted to engage said seat to close communication between the said passages, a flexible diaphragm closing the outer end of the chamber, and a coiled spring holding the auxiliary valve against said diaphragm.

3. In a pressure-controlling device, a body portion having inlet and outlet ends with a partition between providing a valve-seat and having a piston-cylinder at one side, a main valve for said valve-seat having a stem and a piston therefor in said cylinder, a top piece closing the outer end of said piston cylinder and having a chamber providing an auxiliary-valve seat with a passage leading therefrom into the piston-cylinder, the said body portion and top piece providing a passage from the inlet end of the body portion to said chamber, an auxiliary valve in said chamber and being adapted to engage said seat to close communication between the said passages, a flexible diaphragm closing the outer end of said chamber, a diaphragm-cap above said diaphragm, a spring for said cap adapted to press upon the diaphragm, an adjusting-nut for said spring adapted to screw into said diaphragm-cap, and a locking-cap adapted to screw onto said adjusting-nut.

4. In a pressure-controlling device, a body portion having inlet and outlet ends with a partition between providing a valve-seat and having a piston-cylinder at one side, a main valve for said valve-seat having a stem and a piston therefor in said cylinder, a top piece closing the outer end of said piston-cylinder and having a chamber providing an auxiliary-valve seat with a passage leading therefrom into the piston-cylinder, the said body portion and top piece providing a passage from the inlet end of the body portion to said chamber, an auxiliary valve in said chamber and being adapted to engage said seat to close communication between the said passages, a flexible diaphragm closing the outer end of said chamber, a diaphragm-cap above said diaphragm, and means for establishing a predetermined pressure upon said diaphragm.

5. In a pressure-controlling device, a body portion having inlet and outlet ends with a partition between providing a valve-seat and having a piston-cylinder at one side, a main valve for said valve-seat having a stem and a piston therefor in said cylinder, a top piece closing the outer end of said piston-cylinder and having a chamber providing an auxiliary-valve seat with a passage leading therefrom into the piston-cylinder, the said body portion and top piece providing a passage from the inlet end of the body portion to said chamber, an auxiliary valve in said chamber and being adapted to engage said seat to close communication between the said passages, a flexible diaphragm closing the outer end of said chamber, a diaphragm-cap above said diaphragm, and a spring on said cap adapted to press upon the said diaphragm.

6. In a pressure-controlling device, a body portion having inlet and outlet ends with a partition between providing a valve-seat and having a piston-cylinder at one side, a main valve for said valve-seat having a stem and a piston therefor in said cylinder, a top piece at the outer end of said piston-cylinder and providing a central chamber interiorly threaded at its lower end, a seating-plug screwed into said threaded end having a passage forming at its upper end a valve-seat, the said body portion of the valve and the top piece providing a passage from the inlet end of the body portion to said passage of the top piece, and an auxiliary valve for said seating-plug.

7. In a pressure-controlling device, a body portion having inlet and outlet ends with a partition between providing a valve-seat and having a piston-cylinder at one side, a main valve for said valve-seat having a stem and a piston therefor in said cylinder, a top piece at the outer end of said piston-cylinder, a seating-plug removably held by said top piece and having a passage forming at its outer end a valve-seat, the said body portion and top piece providing channels placing said passage in communication with the inlet end of the valve-body portion and the piston-cylinder, and an auxiliary valve for said seat of said plug.

8. In a pressure-controlling device, a body portion having inlet and outlet ends with a partition between providing a valve-seat and having a piston-cylinder at one side, a main valve for said valve-seat having a stem and a piston therefor in said cylinder, a top piece at the outer end of said piston-cylinder and providing a control-chamber, a removable seating-plug at the lower end of said chamber having a passage forming at its end next the top piece a valve-seat and leading to the piston-cylinder, the said body portion and top piece providing a passage from the inlet end of the body portion to said chamber, and an auxiliary valve for said seat of said plug.

9. In a pressure-controlling device, a body portion having inlet and outlet ends with a partition between providing a valve-seat and having a piston-cylinder at one side, a main valve for said valve-seat having a stem and a piston therefor in said cylinder, a top piece closing the outer end of said piston-cylinder and having a chamber providing an auxiliary-valve seat with a passage leading therefrom to the piston-cylinder, the said body portion and top piece providing a passage from the inlet end of the body portion to said chamber, an auxiliary valve in said chamber having the direction of its closing movement the same as the direction of flow of the fluid through said passage and being adapted to close communication between the said passages, a flexible diaphragm closing the outer end of said chamber, and means for holding the auxiliary valve against said diaphragm.

10. In a pressure-controlling device, a body portion having inlet and outlet ends with a partition between providing a valve-seat and having a piston-cylinder at one side, a main valve for said valve-seat adapted to close with the flow therethrough and having a stem and a piston therefor in said cylinder, a top piece closing the outer end of said piston-cylinder and having a chamber providing an auxiliary-valve seat with a passage leading therefrom to the piston-cylinder, the said body-piece and top piece providing a passage from the inlet end of the valve-body to said chamber, an auxiliary valve in said chamber having the direction of its closing movement the same as the direction of flow of the fluid through said passage and being adapted to close communication between the said passages, a flexible diaphragm closing the outer end of said chamber, and means for holding the auxiliary valve against said diaprhagm.

11. In a pressure controlling device of the class set forth, the combination with a casing having an inlet and outlet with a valve between the latter, a cylinder, a piston in said cylinder controlling the valve, of an auxiliary chamber having a port leading to said cylinder, an auxiliary valve controlling said port and provided with a spring, and means for controlling the said auxiliary valve to regulate the initial pressure to said cylinder, comprising a spring, a diaphragm, a pressure chamber in which said diaphragm is located, and a port leading from the inlet side of the device and communicating with the said pressure chamber below the diaphragm, the latter spring tending to open the auxiliary valve as initial pressure varies.

12. In a pressure controlling device of the class set forth, the combination with a casing having an inlet and outlet, a valve controlling communication between the inlet and outlet and actuated by the high pressure fluid from the inlet side of the device, a pressure chamber having communication with the inlet or initial pressure-receiving portion of the casing, a diaphragm in said chamber, an auxiliary chamber having communication with the pressure chamber, a piston chamber having a piston therein coöperating with the valve controlling communication between the outlet and inlet portions of the casing, and an auxiliary valve in the auxiliary chamber for automatically regulating the flow of high pressure fluid to the said cylinder.

13. In a pressure controlling device of the class set forth, the combination with a casing having an inlet and outlet, a valve controlling communication between the inlet and outlet, a pressure chamber having communication with the inlet portion of the casing, a diaphragm in the said chamber, an auxiliary valve and a piston operating between the diaphragm and the valve controlling communication between the inlet and outlet, and positive means tending to open the auxiliary valve as the initial pressure varies.

14. In a pressure controlling device of the class set forth, the combination with a casing having an inlet and an outlet, a valve controlling communication between the said inlet and outlet, a pressure chamber having continuous unobstructed communication with the inlet side of the device to permit the initial high pressure to coöperate therewith, a diaphragm in the said pressure chamber, a piston cylinder having a piston therein and movable to loosely engage a portion of the valve controlling communication between the inlet and outlet of the casing, an auxiliary valve for controlling communication between the pressure chamber and piston chamber, and means for automatically controlling the auxiliary valve and regulating the high pressure fluid from the pressure chamber into said cylinder.

15. In a device of the class set forth, the combination of a pressure chamber having a diaphragm therein, an auxiliary valve chamber having port means normally establishing communication with the pressure chamber, a piston chamber, with a piston therein, means for automatically controlling the admission of high pressure fluid from the auxiliary valve chamber to the piston chamber and movable to close said port means and the piston chamber, and a valve casing having an inlet and outlet with a valve controlling communication between the same and engaged by a portion of the piston, said inlet having communication with the pressure chamber.

16. In a device of the class set forth, the combination with an inlet and an outlet, a main valve controlling communication between the inlet and outlet, a pressure chamber having continuous communication with the inlet, a diaphragm in the pressure chamber, a piston chamber having a piston therein coöperating with the main valve, an auxiliary valve chamber having a port leading to the piston chamber, an auxiliary valve in the auxiliary valve chamber and automatically operative to control communication between the pressure and piston chambers, the auxiliary valve having loose engagement with the diaphragm, and counteracting means coöperating with the diaphragm.

17. A pressure controlling device of the class set forth, comprising a casing having an inlet and outlet, a valve controlling communication between the inlet and outlet, a pressure chamber having a diaphragm therein, a piston chamber with a piston therein coöperating with said valve controlling communication between the inlet and outlet, an auxiliary valve chamber with an auxiliary valve therein and having communication with the piston chamber, and yielding means operating with the diaphragm in opposition to the high pressure on the latter, the auxiliary valve normally bearing against the side of the diaphragm opposite that engaged by the yielding means.

18. In a device of the class set forth, the combination of a pressure chamber having a diaphragm therein, means for permitting a high pressure fluid to act on one side of the diaphragm, and opposing means coöperating with the other side of the diaphragm, in combination with a casing having an inlet and outlet, a valve controlling communication between the inlet and outlet, an auxiliary valve and a piston between the pressure chamber and the valve controlling communication between the inlet and outlet, said auxiliary valve being movable toward its seat by said diaphragm, and positive means for moving said auxiliary valve away from its seat in opposition to the diaphragm.

19. In a device of the class set forth, the combination with an inlet and outlet and a main valve controlling communication between the inlet and outlet, of a piston chamber having a piston therein coöperating with the main valve, an auxiliary valve chamber having an auxiliary valve therein and provided with a port leading from the auxiliary valve chamber to the piston chamber, a pressure chamber adapted to have communication with the auxiliary valve chamber, the auxiliary valve being provided with means to control communication between its chamber and the pressure chamber, the pressure chamber also having communication with the inlet or high pressure side of the device, a diaphragm in the pressure chamber, and means engaging the diaphragm and acting in opposition to the pressure on the latter.

20. A device of the class set forth comprising a casing having an inlet and an outlet, a main valve controlling communication between said inlet and outlet, a pressure chamber, a piston valve having a piston therein cooperating with the main valve, an auxiliary valve chamber having a port leading to the piston chamber, an auxiliary valve in said auxiliary valve chamber to automatically control the high pressure fluid passing from the pressure chamber through said port to the piston chamber, and a diaphragm in the pressure chamber and independent of the auxiliary valve for controlling the entrance of high pressure to the auxiliary chamber.

21. A device of the class set forth comprising an inlet and an outlet, a main valve controlling communication between the inlet and outlet, a piston to act against the valve to move the same in a direction to put the inlet and outlet in communication, an auxiliary valve to control the supply of high pressure fluid to the piston from said inlet, a diaphragm operable by high pressure fluid and, when thus operated, serving to free said auxiliary valve, and means for positively operating the auxiliary valve when thus freed to permit the flow of fluid toward the piston to actuate the latter.

In testimony whereof I have hereunto set my hand in the presence of two subscribing witnesses.

WILLIAM F. KRICHBAUM.

Witnesses:

PATRICK J. DOLAN,
MICHAEL J. TANSEY.